(12) United States Patent
Cioranesco et al.

(10) Patent No.: US 11,743,028 B2
(45) Date of Patent: *Aug. 29, 2023

(54) PROTECTING BLOCK CIPHER COMPUTATION OPERATIONS FROM EXTERNAL MONITORING ATTACKS

(71) Applicant: Cryptography Research, Inc., San Jose, CA (US)

(72) Inventors: Jean-Michel Cioranesco, Paris (FR); Elena Trichina, Aix-en-Provence (FR); Elke De Mulder, Kirkland, WA (US); Matthew Pond Baker, San Francisco, CA (US)

(73) Assignee: Cryptography Research, Inc., San Jose, CA (US)

( * ) Notice: Subject to any disclaimer, the term of this patent is extended or adjusted under 35 U.S.C. 154(b) by 81 days.

This patent is subject to a terminal disclaimer.

(21) Appl. No.: 17/009,361

(22) Filed: Sep. 1, 2020

(65) Prior Publication Data

US 2021/0058228 A1    Feb. 25, 2021

Related U.S. Application Data

(63) Continuation of application No. 15/682,881, filed on Aug. 22, 2017, now Pat. No. 10,771,235.

(Continued)

(51) Int. Cl.
*H04L 9/00*    (2022.01)
*H04L 9/14*    (2006.01)
*H04L 9/06*    (2006.01)

(52) U.S. Cl.
CPC ............ *H04L 9/002* (2013.01); *H04L 9/0618* (2013.01); *H04L 9/14* (2013.01); *H04L 2209/12* (2013.01); *H04L 2209/16* (2013.01)

(58) Field of Classification Search
CPC . H04L 2209/12; H04L 2209/16; H04L 9/002; H04L 9/0618; H04L 9/14
See application file for complete search history.

(56) References Cited

U.S. PATENT DOCUMENTS 4,543,646 A * 9/1985 Ambrosius, III ... G06F 15/7842
                                                                713/174
5,724,428 A    3/1998 Rrivest
(Continued)

FOREIGN PATENT DOCUMENTS

WO    WO-99-14889 A1    3/1999

OTHER PUBLICATIONS

Search Query Report from IP.com (performed May 21, 2022) (Year: 2022).*

(Continued)

*Primary Examiner* — Sharon S Lynch
(74) *Attorney, Agent, or Firm* — Lowenstein Sandler LLP

(57) ABSTRACT

Systems and methods for protecting block cipher computation operations, from external monitoring attacks. An example apparatus for implementing a block cipher may comprise: a first register configured to store a first pre-computed mask value represented by a combination of a first random value and a second random value; a second register configured to store an output mask value, wherein the output mask value is an inverse permutation function of the first random value; a third register configured to store a second pre-computed mask value represented by a combination of the first pre-computed mask value and a permutation function of the output mask value; a fourth register configured to store an input mask value, wherein the input mask value is a combination of an expansion function of the first random value and a key mask value; a non-linear transformation circuit configured to apply the expansion function to a masked round state, perform a non-linear transformation of (Continued)

a combination of a masked key with an output of the expansion function, and apply the permutation function to the output of the non-linear transformation, wherein the non-linear transformation is defined using the input mask value stored in the fourth register and the output mask value stored in the second register; and two round feedback circuits configured to swap the masked round state produced by the non-linear transformation and combine the masked round state with the first pre-computed mask value stored in the first register and the second pre-computed mask value stored in the third register.

13 Claims, 14 Drawing Sheets

Related U.S. Application Data

(60) Provisional application No. 62/504,874, filed on May 11, 2017, provisional application No. 62/382,646, filed on Sep. 1, 2016.

(56) References Cited

U.S. PATENT DOCUMENTS

| | | | | |
|---|---|---|---|---|
| 5,727,062 | A | 3/1998 | Ritter | |
| 5,838,796 | A | 11/1998 | Mittenthal | |
| 6,278,783 | B1* | 8/2001 | Kocher | G06F 21/556 380/42 |
| 6,295,606 | B1* | 9/2001 | Messerges | H04L 9/0625 380/1 |
| 6,327,661 | B1 | 12/2001 | Kocher et al. | |
| 6,820,814 | B1* | 11/2004 | Benoit | H04L 9/003 235/487 |
| 7,092,525 | B2* | 8/2006 | Matchett | H04L 9/0625 380/42 |
| 7,397,916 | B2* | 7/2008 | Johnson | G06F 21/125 380/28 |
| 7,668,310 | B2* | 2/2010 | Kocher | G06F 21/602 380/37 |
| 7,764,786 | B2* | 7/2010 | Liardet | H04L 9/003 713/189 |
| 7,787,620 | B2* | 8/2010 | Kocher | G06F 21/755 380/46 |
| 7,809,135 | B2* | 10/2010 | Johnson | G06F 21/14 713/193 |
| 7,848,515 | B2* | 12/2010 | Dupaquis | H04L 9/002 380/255 |
| 7,970,129 | B2* | 6/2011 | Trichina | H04L 9/003 380/28 |
| 8,065,532 | B2* | 11/2011 | Shu | G06F 21/755 726/22 |
| 8,095,993 | B2* | 1/2012 | Shu | G06F 21/755 713/193 |
| 8,340,282 | B2* | 12/2012 | Shirai | H04L 9/0618 380/29 |
| 8,473,751 | B2* | 6/2013 | Rivain | H04L 9/003 713/189 |
| 8,595,490 | B2* | 11/2013 | von Mueller | G06Q 20/12 713/168 |
| 8,705,731 | B2* | 4/2014 | Trichina | H04L 9/0618 380/28 |
| 8,958,550 | B2* | 2/2015 | Tang | H04L 9/16 380/28 |
| 9,123,042 | B2* | 9/2015 | von Mueller | G06Q 20/3823 |
| 9,503,255 | B2* | 11/2016 | Hamilton | H04L 9/003 |
| 9,515,820 | B2* | 12/2016 | Pepin | H04L 9/002 |
| 9,722,773 | B2* | 8/2017 | Prouff | H04L 9/002 |
| 9,906,360 | B2* | 2/2018 | Johnson | H04L 9/0631 |
| 10,103,876 | B2* | 10/2018 | Hamilton | H04L 9/003 |
| 10,419,207 | B2* | 9/2019 | Domosi | G06F 9/4498 |
| 11,194,933 | B2* | 12/2021 | Belenky | G06F 21/602 |
| 11,418,339 | B2* | 8/2022 | Tang | H04L 9/16 |
| 2001/0053220 | A1* | 12/2001 | Kocher | H04L 9/0625 380/29 |
| 2002/0051534 | A1* | 5/2002 | Matchett | H04L 9/0625 380/42 |
| 2003/0093684 | A1* | 5/2003 | Kaiserswerth | H04L 63/062 713/193 |
| 2004/0030905 | A1* | 2/2004 | Chow | H04L 9/003 713/189 |
| 2004/0139340 | A1* | 7/2004 | Johnson | H04L 9/0625 380/1 |
| 2005/0111659 | A1* | 5/2005 | Shirai | H04L 9/002 380/37 |
| 2005/0271202 | A1* | 12/2005 | Shu | G06F 9/3001 712/E9.035 |
| 2005/0283714 | A1* | 12/2005 | Korkishko | G06F 7/724 714/781 |
| 2006/0045264 | A1* | 3/2006 | Kocher | G06F 21/556 380/37 |
| 2006/0056622 | A1* | 3/2006 | Liardet | H04L 9/0625 380/28 |
| 2006/0090081 | A1* | 4/2006 | Baentsch | G06F 21/76 713/189 |
| 2006/0140401 | A1* | 6/2006 | Johnson | G06F 21/14 380/44 |
| 2006/0177052 | A1* | 8/2006 | Hubert | H04L 9/003 380/29 |
| 2007/0180541 | A1* | 8/2007 | Shu | G06F 9/3001 726/34 |
| 2008/0019503 | A1* | 1/2008 | Dupaquis | H04L 9/002 380/28 |
| 2008/0260145 | A1* | 10/2008 | Trichina | H04L 9/003 380/46 |
| 2009/0103716 | A1* | 4/2009 | Shirai | H04L 9/002 380/28 |
| 2010/0246814 | A1* | 9/2010 | Olson | G06F 9/30007 380/29 |
| 2010/0246815 | A1* | 9/2010 | Olson | H04L 9/0625 712/205 |
| 2010/0250964 | A1* | 9/2010 | Olson | G06F 9/30167 712/205 |
| 2010/0250965 | A1* | 9/2010 | Olson | G06F 9/30007 380/28 |
| 2011/0055585 | A1* | 3/2011 | Lee | H04L 9/3218 713/183 |
| 2011/0228928 | A1* | 9/2011 | Trichina | H04L 9/003 380/28 |
| 2011/0231636 | A1* | 9/2011 | Olson | H04L 9/0631 713/189 |
| 2012/0124392 | A1* | 5/2012 | Ciet | H04L 9/002 713/189 |
| 2012/0250854 | A1* | 10/2012 | Danger | H04L 9/003 380/28 |
| 2013/0156180 | A1* | 6/2013 | Hess | H04L 9/003 380/28 |
| 2015/0163054 | A1* | 6/2015 | Roelse | H04L 9/0838 380/278 |
| 2015/0280906 | A1* | 10/2015 | Shany | H04L 9/004 380/29 |
| 2016/0105276 | A1* | 4/2016 | Brumley | H04L 9/003 380/28 |
| 2016/0127123 | A1* | 5/2016 | Johnson | H04L 9/003 713/189 |
| 2017/0257212 | A1* | 9/2017 | Domosi | H04L 9/0618 |
| 2017/0373831 | A1* | 12/2017 | Wurcker | H04L 9/14 |
| 2017/0373832 | A1* | 12/2017 | Wurcker | G09C 1/00 |
| 2019/0286853 | A1* | 9/2019 | Belenky | H04L 9/0643 |

OTHER PUBLICATIONS

Search Query Report from IP.com (performed Nov. 15, 2022) (Year: 2022).*

Search Query Report from IP.com (performed Mar. 16, 2023) (Year: 2023).*

(56) References Cited

OTHER PUBLICATIONS

Akkar, M. L. et al., "A Generic Protection against High-Order Differential Power Analysis", Fast Software Encryption, Feb. 2003, pp. 192-205. 16 pages.
Akkar,, M. L. et al., "An Implementation of DES and AES, Secure against Some Attacks", Cryptographic Hardware and Embedded Systems—CHES 2001, pp. 309-318, May 2001. 10 pages.
Search Query Report from IP.com (performed Apr. 22, 2020). 4 pages.
Standaert, F.X. et al., "FPGA Implementations of the DES and Triple-DES Masked against Power Analysis Attacks", IEEE International Conference on Field Programmable Logic and Applications, FPL'06, Aug. 2006, pp. 1-4. 4 pages.

* cited by examiner

_300_

|         | MaskL              | MaskR              |
|---------|--------------------|--------------------|
| Round 1 | maskL              | maskR              |
| Round 2 | maskR              | maskL ^ P (M$_{out}$) |
| Round 3 | maskL ^ P (M$_{out}$) | maskR ^ P (M$_{out}$) |
| Round 4 | maskR ^ P (M$_{out}$) | maskL              |
| Round 5 | maskL              | maskR              |
| Round 6 | maskR              | maskL ^ P (M$_{out}$) |
| ...     | ...                | ...                |

FIG. 3

PROTECTING BLOCK CIPHER COMPUTATION OPERATIONS FROM EXTERNAL MONITORING ATTACKS

RELATED APPLICATIONS

This application is a continuation of U.S. patent application Ser. No. 15/682,881, filed Aug. 22, 2017, which claims the benefit of U.S. Provisional Application No. 62/382,646 filed Sep. 1, 2016, entitled "Side-Channel Resistant Hardware Architecture of Triple Data Encryption Algorithm (TDEA) with Two Fixed Masks for Odd or Even Rounds of Operation" and U.S. Provisional Application No. 62/504,874 filed May 11, 2017, entitled "Protecting Block Cipher Computation Operations from External Monitoring Attacks." The above-referenced applications are incorporated herein by reference in their respective entireties.

TECHNICAL FIELD

The present disclosure is generally related to computer systems, and is more specifically related to cryptographic data processing systems and methods.

BACKGROUND

Since the advent of computers, constantly evolving have been not only various systems and methods for safeguarding cryptographic keys and/or other sensitive data, but also systems and methods for gaining unauthorized access to the protected data, ranging from conceptually unsophisticated brute force password cracking to complex external monitoring attacks.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 3 schematically illustrates an example mask swapping schedule implemented by example TDEA circuits operating in accordance with one or more aspects of the present disclosure;

DETAILED DESCRIPTION

Figure 1:
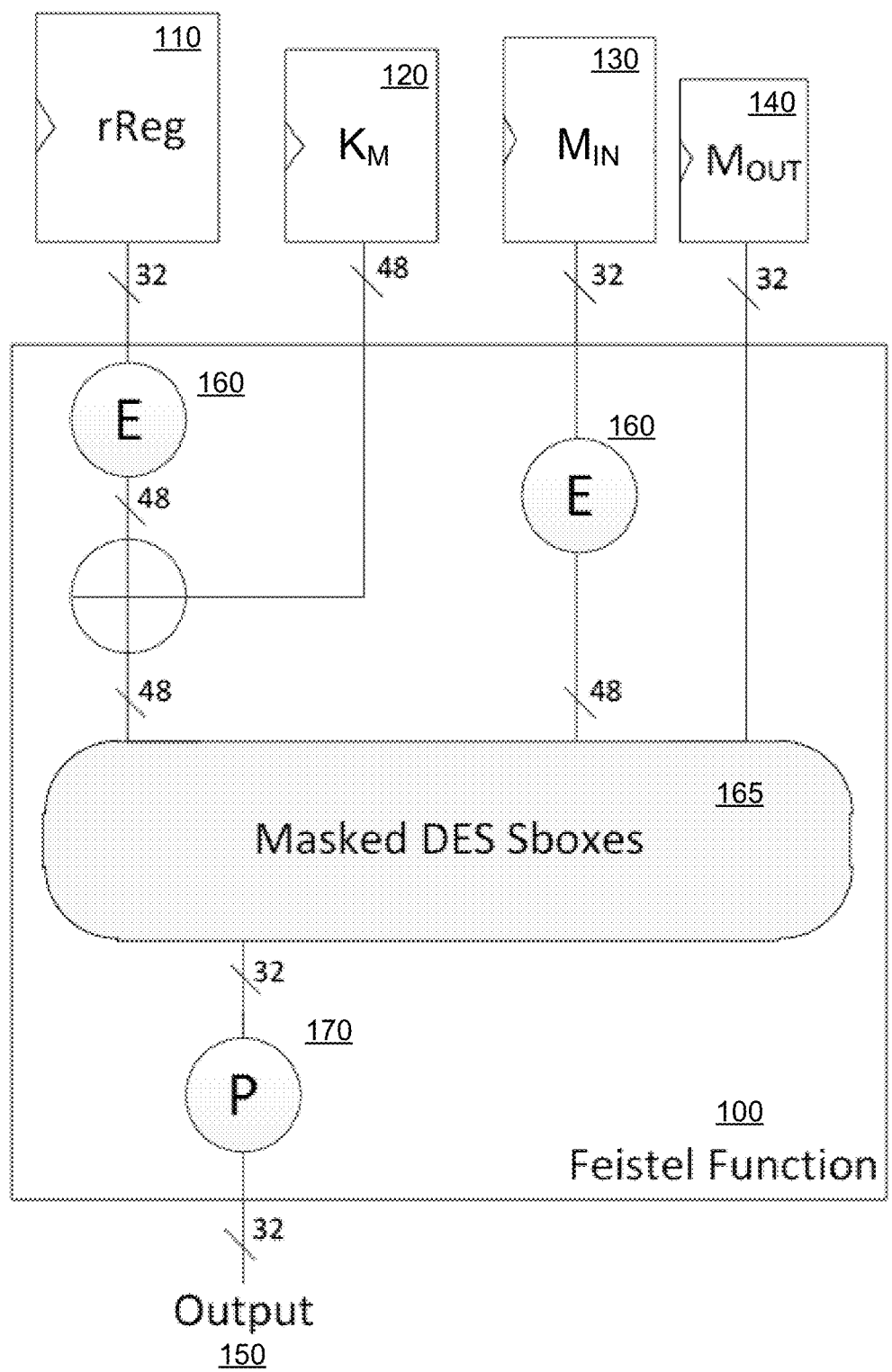
FIG. 1 schematically illustrates a block diagram of an example masked Feistel function implementation, in accordance with one or more aspects of the present disclosure.

Described herein are systems and methods for protecting cryptographic data processing operations, such as block cipher computation operations, from external monitoring attacks.

"Cryptographic data processing operation" herein shall refer to a data processing operation involving secret parameters (e.g., encryption/decryption operations using secret keys). "Cryptographic data processing device" herein shall refer to a data processing device (e.g., a general purpose or specialized processor, a system-on-chip, a cryptographic hardware accelerator, or the like) configured or employed for performing cryptographic data processing operations.

"Block cipher" herein shall refer to a cryptographic method which processes blocks of plaintext of a certain size in order to produce the corresponding ciphertext and/or blocks of ciphertext to produce the corresponding plaintext. "External monitoring attack" herein shall refer to a method of gaining unauthorized access to protected information by deriving one or more protected information items from certain aspects of the physical implementation and/or operation of the target cryptographic data processing device. Side channel attacks are external monitoring attacks that are based on measuring values of one or more physical parameters associated with operations of the target cryptographic data processing device, such as the elapsed time of certain data processing operations, the power consumption by certain circuits, the current flowing through certain circuits, heat or electromagnetic radiation emitted by certain circuits of the target cryptographic data processing device, etc.

Various side channel attacks may be designed to obtain unauthorized access to certain protected information (e.g., encryption keys that are utilized to transform the input plain text into a cipher text) being stored within and/or processed by a target cryptographic system. In an illustrative example, an attacker may exploit interactions of sequential data manipulation operations which are based on certain internal states of the target data processing device. The attacker may apply differential power analysis (DPA) methods to measure the power consumption by certain circuits of a target cryptographic data processing device responsive to varying one or more data inputs of sequential data manipulation operations, and thus determine one or more protected data items (e.g., encryption keys) which act as operands of the data manipulation operations.

Protecting cryptographic operations from external monitoring attacks may involve employing variable masking schemes. In an illustrative example, the external monitoring attack counter-measures may include applying a randomly generated integer mask to a secret value by performing the bitwise exclusive disjunction operation. In order to mask a secret value S, a mask M is applied to it by the exclusive disjunction operation; to remove the mask, the exclusive disjunction is performed on the masked secret value and the mask. In more complex scenarios, e.g., in which a masked value is processed by a non-linear operation, the mask correction value (i.e., the value that is employed to remove a previously applied mask) may differ from the mask.

However, implementing a masking scheme may not be sufficient for protecting certain multi-round cryptographic operations from round leakage, which may be caused by correlations of intermediate values that are processed by adjacent rounds. In an illustrative example, a block cipher may be provided by the Triple Data Encryption Algorithm (TDEA). TDEA is based on the Data Encryption Algorithm (DEA) cryptographic engine.

The DEA cryptographic engine may be employed to cryptographically protect (e.g., encrypt) 64-bit data blocks of data using a 64-bit key. Subsequent processing of the protected data (e.g., decryption) is accomplished using the same key as was used to protect the data. The DEA engine subjects an input data block to an initial permutation, then to multiple rounds of complex key-dependent computations that employ substitution tables (also referenced herein as "S-boxes"), and finally to a permutation that is the inverse of the initial permutation, as described in more detail herein below.

The present disclosure introduces systems and methods for protecting cryptographic data processing operations, such as block cipher computation operations, from external monitoring attacks, by utilizing pre-computed mask values for the linear part of the data path in order to avoid simultaneous manipulation on masks and masked values. These pre-computed mask values may be stored in registers and not being manipulated during round computations. Furthermore, possible correlations may be reduced by register pre-charging, as described in more detail herein below. The systems and methods described herein provide lightweight implementations that minimize round leakage and other correlations in the linear part of the block cipher data path and are applicable to a wide range of block cipher implementations that utilize masked S-boxes. Thus, the systems and methods described herein represent improvements to the functionality of general purpose or specialized computing devices, by enabling performance of cryptographic data processing operations in a manner resistant to external monitoring attacks.

The systems and methods described herein may be implemented by hardware (e.g., general purpose and/or specialized processing devices, and/or other devices and associated circuitry), software (e.g., instructions executable by a processing device), or a combination thereof. Various aspects of the methods and systems are described herein by way of examples, rather than by way of limitation. In particular, the bus width values are shown in FIGS. 1-13 and referenced in the accompanying description for illustrative purposes only and do not limit the scope of the present disclosure to any particular bus width values.

In various illustrative examples described herein below, cryptographic data processing devices may be configured or employed for implementing TDEA cryptographic operations. However, the systems and methods described herein for performing cryptographic data processing operations in a manner resistant to external monitoring attacks may be applicable to various other cryptographic data processing methods.

As noted herein above, the DEA engine subjects an input data block to an initial permutation, then to multiple rounds of complex key-dependent computations, and finally to a permutation that is the inverse of the initial permutation. DEA forward transformation may be described as follows:

$$L_n = R_{n-1}$$

$$R_n = L_{n-1} \oplus F(R_{n-1}, K_n),$$

where n is the number of the round in the range from 1 to 16;

$L_n$ and $R_n$ are left (uppermost) and right (lowermost) bit strings of the permuted input block such that their concatenation produces the round state: $RS_n = \text{cat}(L_n, R_n)$;

$K_n$ is the round key; and $\oplus$ represents the exclusive disjunction (XOR) operation (i.e. bitwise modulo 2 addition of bit sequences of equal size).

DEA inverse transformation may be described as follows:

$$R_{n-1} = L_n$$

$$L_{n-1} = R_n \oplus F(L_n, K_n),$$

where $R_{16}L_{16}$ is the permuted input block for the inverse transformation.

The Feistel function (denoted as F) utilizes a 48-bit key to processes a 32-bit input data block through multiple parallel substitution tables (also referred to as "S-boxes") in order to produce a 32-bit output data block. An S-box may be represented by a rectangular table that produces an m-bit output corresponding to an n-bit input. An S-box may be implemented as a static table or may by dynamically generated on-the-fly.

TDEA forward cipher operation involves three consecutive DEA operations using a key bundle comprising three keys:

$$\text{Output} = \text{Enc}_{Key3}(\text{Dec}_{Key2}(\text{Enc}_{key1}(d))),$$

where $\text{Enc}_{Keyx}(d)$ and $\text{Dec}_{Keyx}(d)$ represent the forward and reverse DEA transformations, respectively.

TDEA reverse cipher operation also involves three consecutive DEA operations:

$$\text{Output} = \text{Dec}_{Key1}(\text{Enc}_{Key2}(\text{Dec}_{key3}(d))).$$

In various illustrative examples, protecting DEA implementations from external monitoring attacks may involve masking the round input state using an input mask, utilizing masked S-boxes for computing a masked transformation output corresponding to the masked input state, and unmasking the masked transformation output using a mask correction value. FIG. 1 schematically illustrates a block diagram of an example masked Feistel function implementation.

As schematically illustrated by FIG. 1, the Feistel function may be implemented by the example non-linear transformation circuit 100 which receives 32-bit input data masked with the input mask $M_{IN}$ from rReg register 110, a 48-bit round key (K) 120, a 32-bit input mask ($M_{IN}$) 130, and a 32-bit output mask ($M_{OUT}$) 140. The input and output masks $M_{IN}$ and $M_{OUT}$ are utilized for pre-computing the masked S-boxes that operate in parallel to implement the non-linear transformation 165. In certain implementations, the input and output masks $M_{IN}$ and $M_{OUT}$ may be changed for every TDEA operation, thus causing re-computation of the corresponding S-boxes. In certain implementations, the input and output masks $M_{IN}$ and $M_{OUT}$ may have the same values.

The non-linear transformation circuit 100 applies the expansion function 160 to the masked round input value stored in the register 110, performs a non-linear transformation 165 of the combination of the masked key $K_M$ stored in the register 120 with the output of the expansion function 160, and applies the permutation function 170 to the output of the non-linear transformation 165. Therefore, the Feistel function output 150 may be defined as follows:

$$\text{Output} = P(S_M(E(\text{rReg}) \oplus K_M)) = P(S(E(X) \oplus K) \oplus M_{OUT}),$$

where E represents the expansion function 160 that expands 32-bit input into 48-bit output, by duplicating certain bits, e.g., according to a pre-defined bit selection table;

$S_M$ represents one or more of pre-computed masked S boxes, such that each S-box accepts an input value $P(X \oplus M_{IN})$ and produces the output value $Y=P(S(E(X) \oplus K_M)$ masked with the output mask $M_{OUT}$;

S represents one or more S-boxes such that each S-box produces a 32-bit output corresponding to a 48-bit input value;

P represents the permutation function 170 that yields a 32-bit output from a 32-bit input by permuting the bits of the input block e.g., according to a pre-defined permutation table; and $rReg=X \oplus M_{IN}$.

Figure 2:
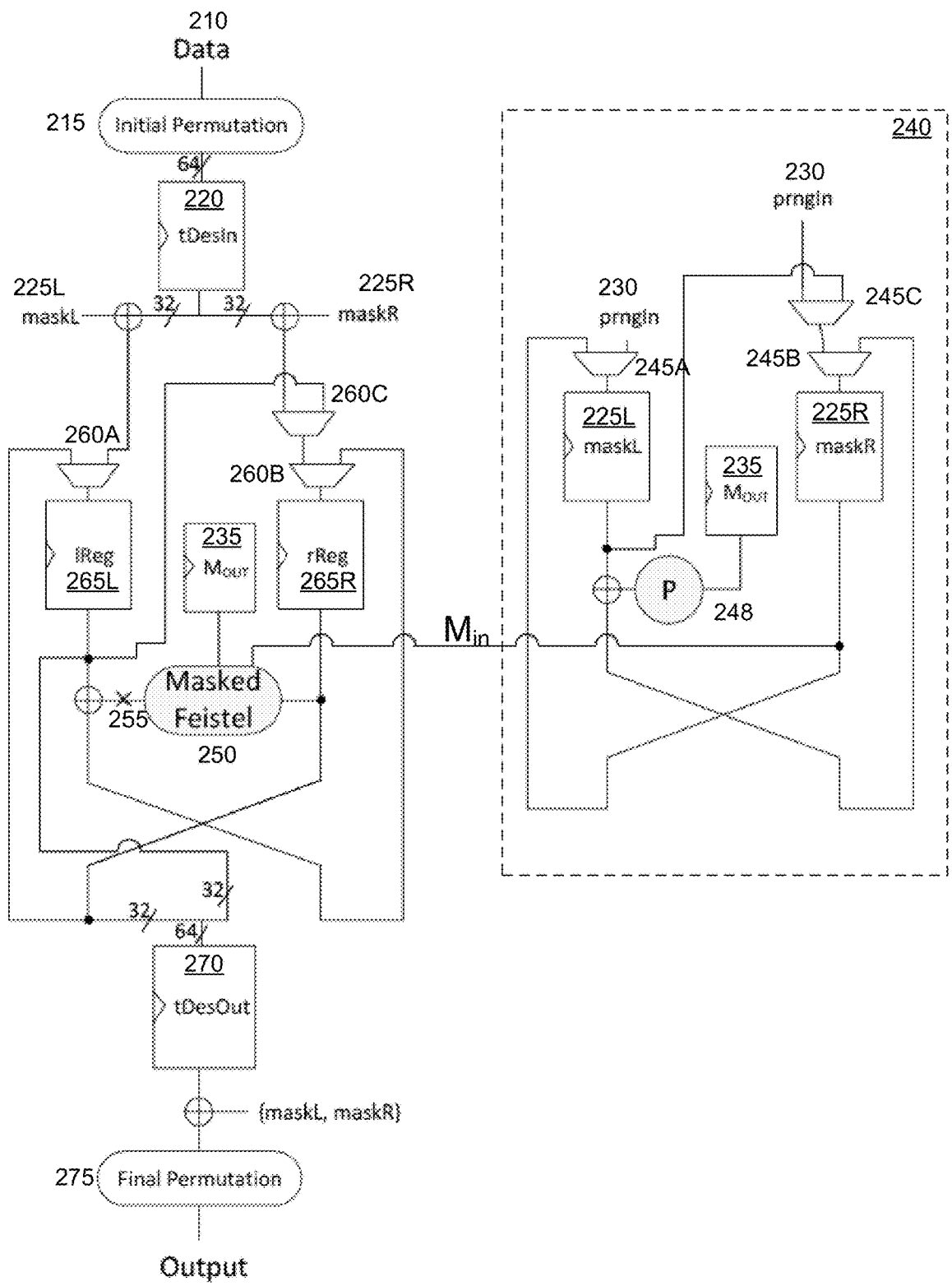
FIG. 2 schematically illustrates an example circuit for masked Triple Data Encryption Algorithm (TDEA) implementation, in accordance with one or more aspects of the present disclosure.
Figure 4:
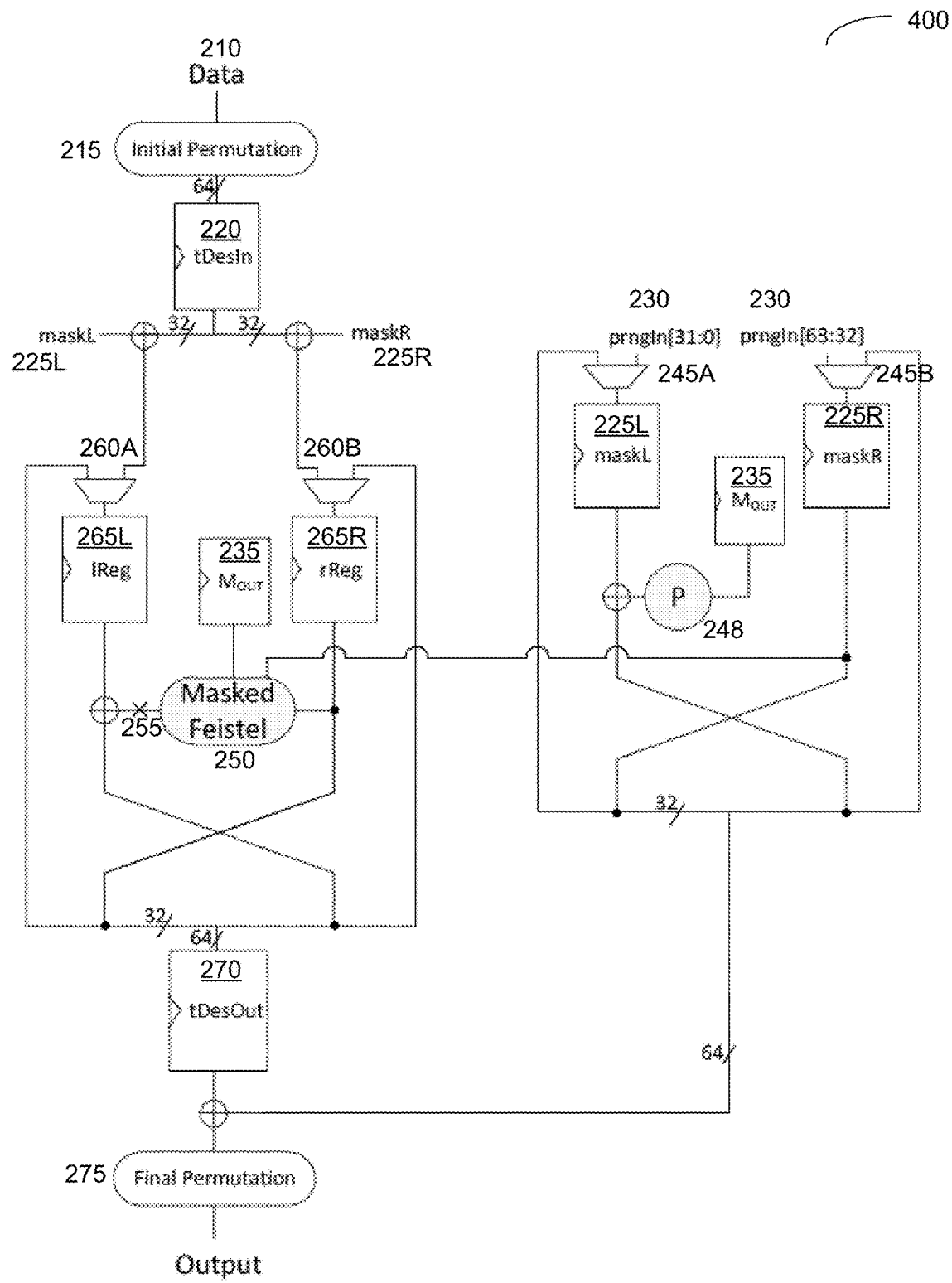
FIGS. 4-7 schematically illustrate example circuits for masked TDEA implementations, in accordance with one or more aspects of the present disclosure.

FIG. 2 schematically illustrates an example circuit 200 for masked TDEA implementation, in accordance with one or more aspects of the present disclosure. As schematically illustrated by FIG. 2, the input data block 210 is processed by the initial permutation 215 and stored in the input register (tDesIn) 220. The permuted input value tDesIn is then masked with masks stored in maskL/maskR registers 225L-225R, which are seeded from a random number generator 230.

The masks stored in maskL/maskR registers 225L-225R may be swapped after completing each DEA round, e.g., according to a mask swapping schedule 300 shown in FIG. 3. As schematically illustrated by FIG. 3, the values of MaskL and MaskR are initially stored in the respective registers 225L-225R and utilized in the first DEA round; in the second round, the values are swapped, and the MaskR value is combined with the permuted output mask $M_{OUT}$; in the third round, the values are swapped again, and the MaskL value is combined with the permuted output mask $M_{OUT}$; in the fourth round, the values are swapped again, and the initial MaskL value is stored in the MaskR register; in the fifth round, the initial values MaskL and MaskR are used; and in the sixth round, the values are swapped, and the MaskR value is combined with the permuted output mask $M_{OUT}$ which is stored in the output mask register 235. In various illustrative examples, the output mask $M_{OUT}$ value may be fixed or modified at every DEA round.

Referring again to FIG. 2, the mask swapping schedule may be implemented by the mask correction data path circuitry 240. Multiplexers 245A-245C, which are controlled by the round number signal, feed the maskL/maskR registers 225L-225R with either random values from the random number generator 230 or the feedback from the previous mask correction iteration. The permutation function 248 implements the same permutation as the permutation function 170 of the masked Feistel implementation which is employed to permute the output mask $M_{OUT}$ stored in the register 235. At every round, the value stored in maskR register 225R may be fed as the input mask $M_{IN}$ to the masked Feistel implementation 250. In certain implementations, an optional register pipe stage 255 can be added on the Feistel function output to reduce the hardware glitch effect.

At every DEA round, two feedback circuits swap the masked round state and feed the swapped round state to the multiplexers 260A-260C, which are controlled by the round number signal. The multiplexers 260A-260C feed the lReg register 265L and rReg register 265R with either the masked input state stored in the register 220 or the feedback from the previous DEA round provided by the feedback circuits.

The masked round state value is then processed by the masked Feistel function 250 and stored in the output register (tDesOut) 270. After the completion of the final round, the resulting round state is unmasked by the concatenation of MaskL and MaskR values, which are stored in the respective registers 225L and 225R, and is then subjected to the final permutation 275.

In various implementations, the example circuit 200 of FIG. 2 may be further optimized. In the example implementation of FIG. 4, the example circuit 200 of FIG. 2 may be modified by eliminating the multiplexers 245C and 260C. At every DEA round, two symmetric feedback circuits swap the masked round state and feed the swapped round state to the multiplexers 260A and 260B, which are controlled by the round number signal. The multiplexers 260A and 260B feed the lReg register 265L and rReg register 265R with either the masked input state stored in the register 220 or the feedback from the previous DEA round provided by the symmetric feedback circuits.

The masked round state value is then processed by the masked Feistel function 250 and stored in the output register (tDesOut) 270. Thus, the example circuit 400 of FIG. 4 exhibits the operational latency which is one clock cycle less than the latency of the example circuit 200 of FIG. 2.

Figure 5:
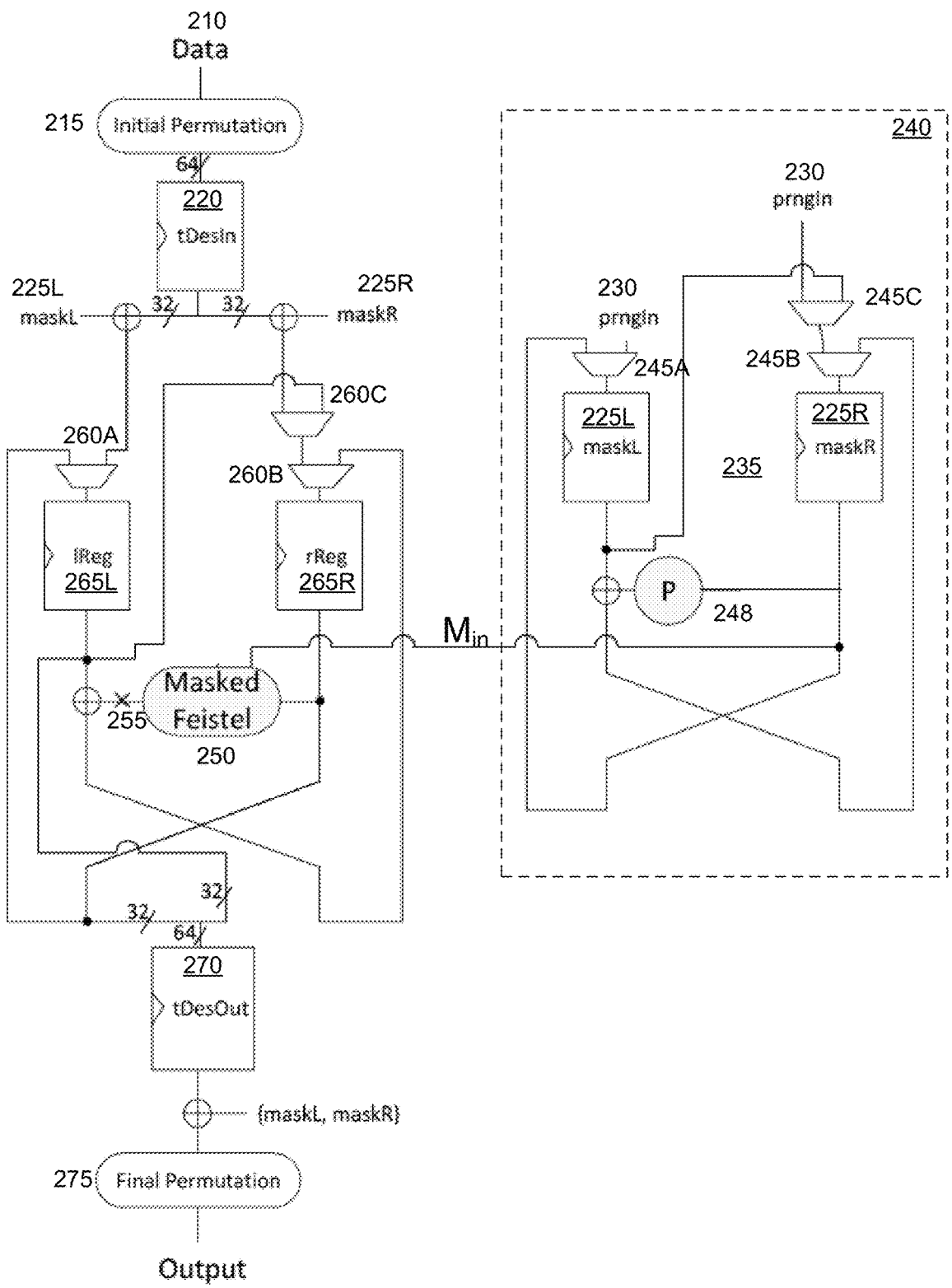

In the example implementation of FIG. 5, the example circuit 200 of FIG. 2 may be modified by utilizing MaskR value, which is stored in the register 225R, as the output mask $M_{OUT}$. Thus, the example circuit 500 of FIG. 5 eliminates the output mask register 235 of FIG. 2.

Figure 6:
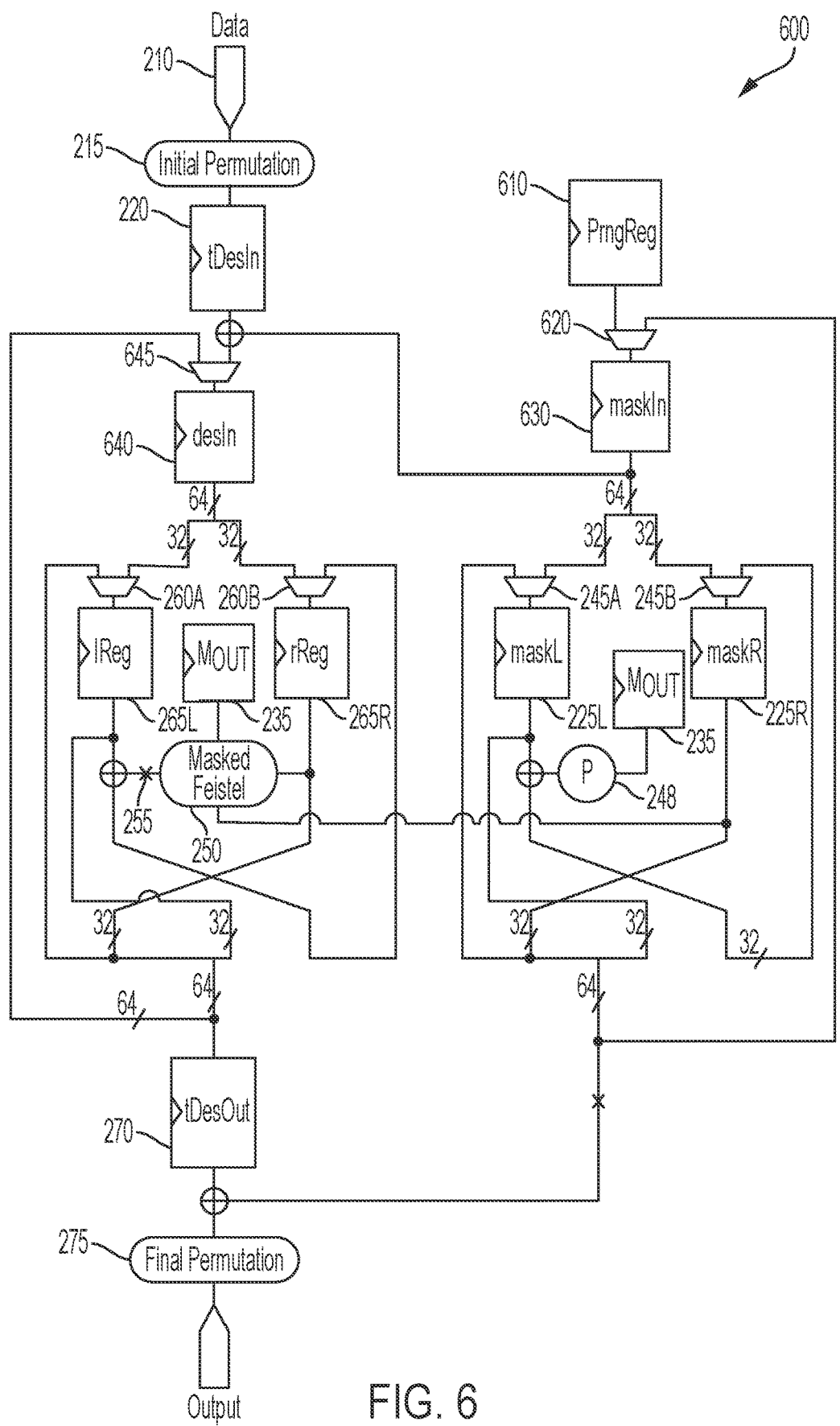

In the example implementation of FIG. 2 and its variations, the first and third DEA operations of TDEA use the same set of masks in all rounds. This dependency is broken in the example circuit 600 of FIG. 6, in which fresh random bits are introduced into the mask at the beginning of each DEA operation of TDEA. As schematically illustrated by FIG. 6, the random value stored in the PrngReg register 610 is fed to the input mask (MaskIn) register 630 via the multiplexer 620, which is controlled by the TDEA operation number signal. Multiplexers 245A and 245B, which are controlled by the round number signal, feed the maskL/maskR registers 225L-225R with either the contents of the input mask (MaskIn) register 630 or the feedback from the previous mask correction iteration. The multiplexer 645 controlled by the TDEA operation number signal feeds the round state register 640 with either the masked initial TDEA operation state or the feedback from the previous DEA round.

Figure 7:
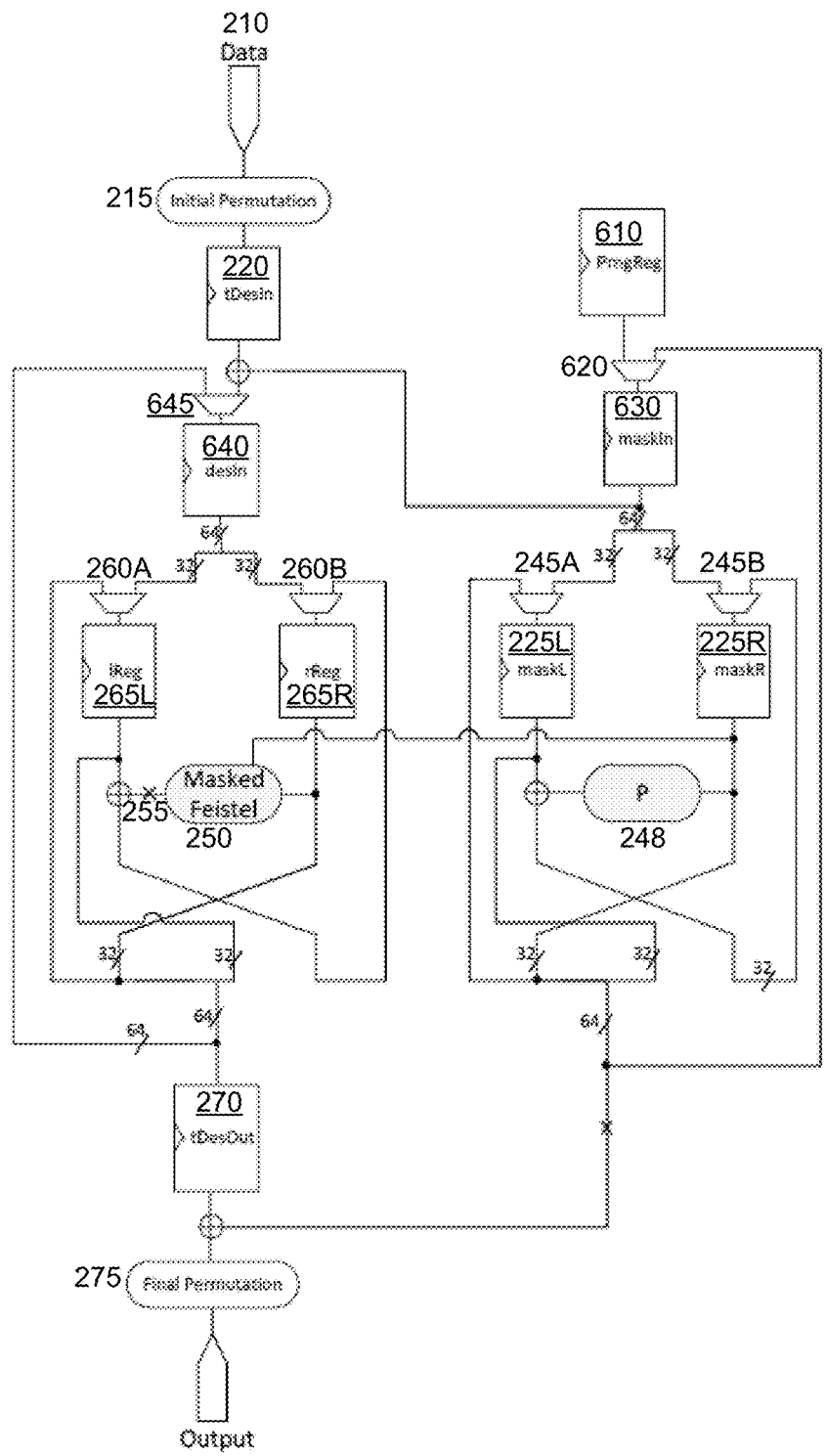

In the example implementation of FIG. 7, the example circuit 600 of FIG. 6 may be modified, similarly to the example implementation of FIG. 5, to utilize MaskR value, which is stored in register 225R, as the output mask $M_{OUT}$. Thus, the example circuit 700 of FIG. 7 eliminates the output mask register 235 of FIG. 6.

In all example implementations depicted in FIG. 2, FIG. 4, FIG. 5, FIG. 6, and FIG. 7, an additional register can be introduced at the output of the Masked Feistel implementation 250 in order to prevent jitter effects and thus increase DPA resistance. The resulting increase in the latency is a matter of trade-off between the throughput of the exemplary implementation and its resistance to DPA attacks.

Due to the above-described structure of the TDEA algorithm that involves regular swaps and overwrites of working registers, the round leakage may not always be eliminated by masking schemes. In accordance with one or more aspects of this disclosure, the above described and other implementations of block cipher computation operations may be protected from external monitoring attacks by utilizing pre-computed mask values for the linear part of the data path in order to avoid simultaneous manipulation on masks and masked values. These pre-computed mask values may be stored in registers and not being manipulated during round computations. Furthermore, possible correlations may be reduced by register pre-charging, i.e., overwriting the registers with random values before loading any values into the registers. The systems and methods described herein provide light-weight implementations that minimize round leakage and other correlations in the linear path of the block cipher data path and are applicable to a wide range of block cipher implementations that utilize masked S-boxes.

Figure 8:
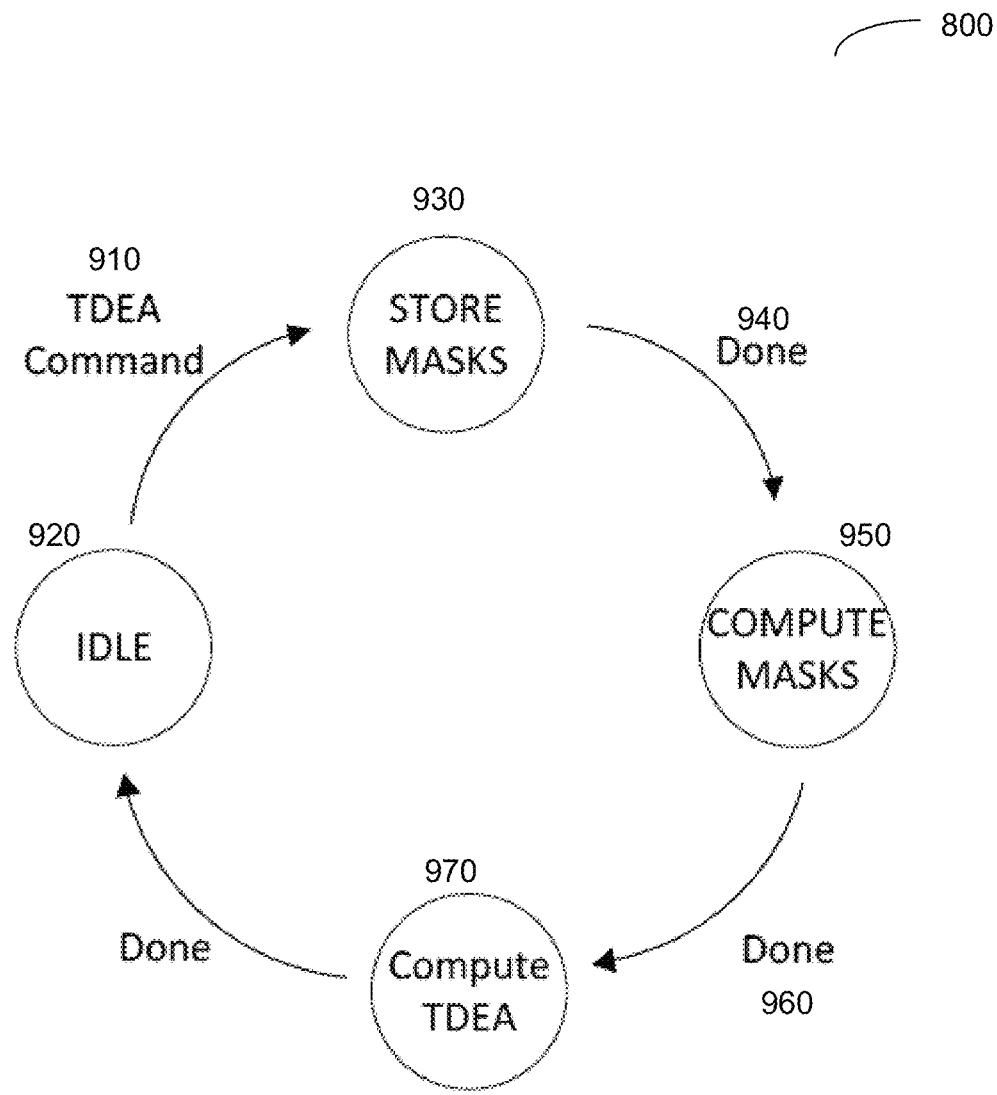
FIG. 8 schematically illustrates a simplified state machine for pre-computing masks and generating S-boxes implemented by example circuits for TDEA computation in accordance with one or more aspects of the present disclosure.

As noted herein above, the mask values utilized for the linear part of the block cipher computation may be pre-computed for each TDEA operation. FIG. 8 schematically illustrates a simplified state machine 800 for pre-computing masks and generating S-boxes, in accordance with one or more aspects of the present disclosure. The state machine which is schematically illustrated by FIG. 8 may be implemented by example implementations described herein below with references to FIGS. 9-13.

As schematically illustrated by FIG. 8, responsive to receiving a TDEA operation request 910, the state machine 800 may transition from the Idle state 920 to the Store Masks state 930, in which the mask values may be loaded to certain system registers, such as the random number generator (PRNG), the left portion of the mask ($M_L$), the right portion of the mask ($M_R$), and the key mask ($M_K$). Upon completing (940) the register load operations, the state machine may transition to the Compute Masks state 950, in which the dependent masks, such as $M_{IN}$, $M_{OUT}$, α, β, and φ, may be computed. Upon completing (960) the dependent mask computation operations, the state machine may transition to the Compute TDEA state 970.

Figure 9:
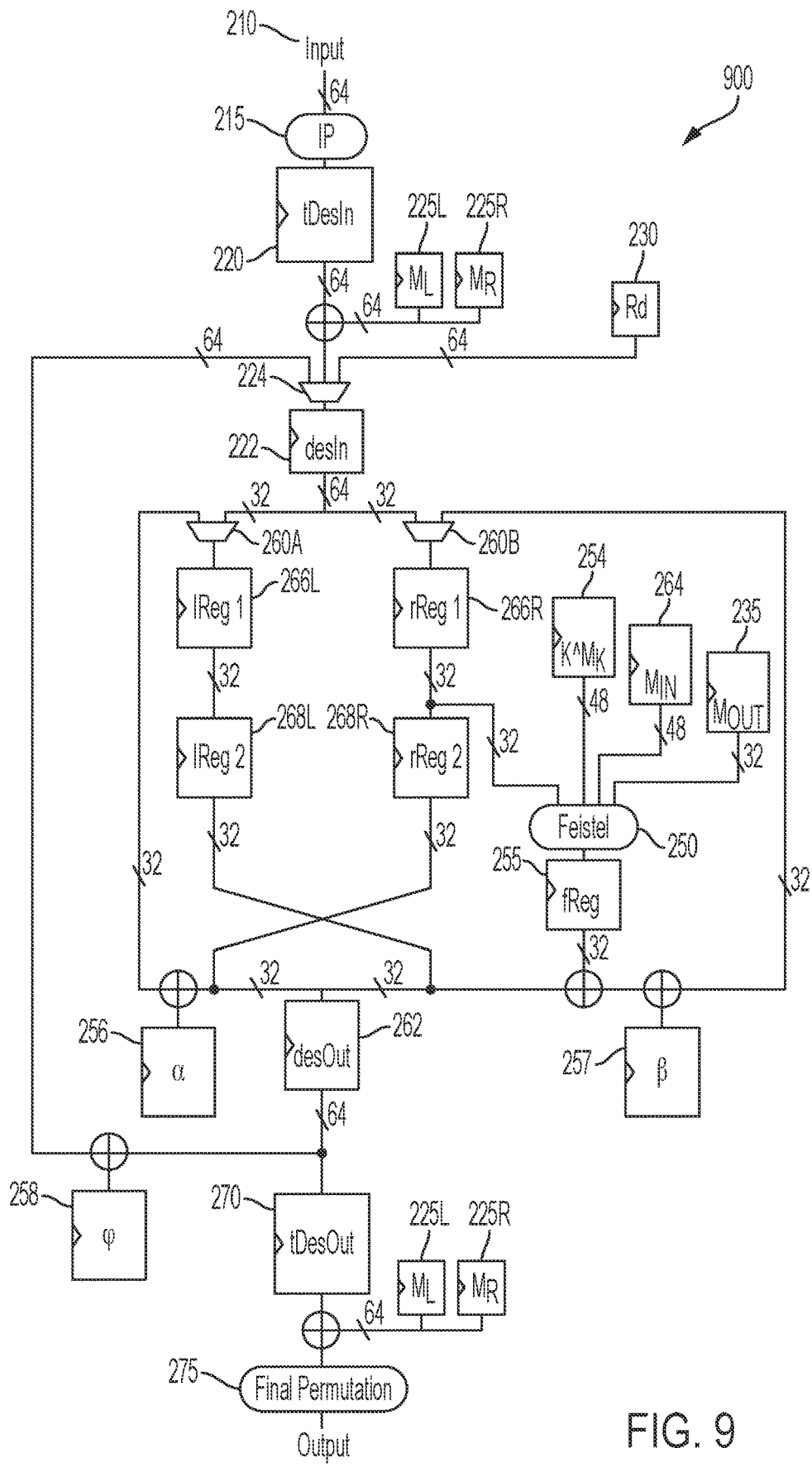
FIGS. 9-13 schematically illustrate example circuits for performing TDEA computations in a manner resistant to external monitoring attacks in accordance with one or more aspects of the present disclosure.

FIG. 9 schematically illustrates an example circuit 900 for performing TDEA computations in a manner resistant to external monitoring attacks, in accordance with one or more aspects of the present disclosure. In the example implementation of FIG. 9, the mask correction data path circuitry 240 of FIG. 2 may be eliminated in favor of pre-computing mask correction values and other dependent masks and storing the pre-computed values in dedicated registers, which are not overwritten during the TDEA operation.

The mask correction values and other dependent masks may be pre-computed and stored in the respective registers. As schematically illustrated by FIG. 9, a first register (256) may be employed to store a first pre-computed mask value α represented by the combination of two random values representing the left and right portions of the mask:

$\alpha = M_L \oplus M_R$, where $M_L$ and $M_R$ respectively represent the left and right portions of the mask, which are stored in registers 225L and 225R, respectively.

A second register (235) may be employed to store the output mask value $M_{OUT}$ represented by the inverse Feistel permutation function of the right portion of the mask:

$M_{OUT} = \text{InvP}(M_R)$, where InvP represents the inverse Feistel permutation function.

A third register (257) may be employed to store a second pre-computed mask value β represented by a combination of the first pre-computed mask value ($\alpha = M_L \oplus M_R$) and the Feistel permutation function of the output mask value:

$\beta = M_L \oplus M_R \oplus P(M_{OUT})$, where P represents the Feistel permutation function.

A fourth register (264) may be employed to store the input mask value $M_{IN}$ represented by the combination of the expansion function of the right portion of the mask and the key mask value $M_K$:

$M_{IN} = E(M_R) \oplus M_K$, where E represents the expansion function, and $M_K$ represents the mask value for masking the round key K.

A fifth register (258) may be employed to store a third pre-computed mask value represented by the concatenation of two first pre-computed mask values α:

$\varphi = \text{cat}(\alpha, \alpha)$, where cat represents the concatenation operation.

In certain implementations, instead of using a register 258 to store a mask correction value (α, α), the 32-bit α value stored in register 256 may be re-used, by duplicating this value and thus obtaining a 64-bit mask correction value used at the end of the DES operation, thus eliminating the register 258 altogether.

The input data block 210 is processed by the initial permutation 215 and stored in the TDEA input register (tDesIn) 220. The permuted input value tDesIn is then masked with masks stored in maskL/maskR registers 225L-225R and stored in the DEA input register (desIn) 222. The multiplexer 224, controlled by the TDEA operation number signal, feeds the register 222 with either the random value stored in the register 230 or the feedback from the previous TDEA operation combined with the third pre-computed mask value φ stored in the register 258. Thus, the random values stored in the register 230 are periodically sent down the data path and utilized for pre-charging other system registers.

At every DEA round, two symmetric round feedback circuits swap the masked round state (which is further combined with the values α and β stored in the registers 256 and 257) and feed the swapped round state to the multiplexers 260A and 260B, which are controlled by the round number signal. The multiplexers 260A and 260B feed the lReg register 266L and rReg register 266R with either the DEA input state stored in the register 222 or the feedback from the previous DEA round provided by the symmetric feedback circuits.

In order to implement register pre-charging, each of lReg and rReg registers 265L-265R of FIG. 2, which are utilized by the example circuit 200 for storing the round state before processing it by the Feistel function, is replaced, in the example implementation of FIG. 9, with a respective pair of serially connected registers lReg1/lReg2 (266L/268L) and rReg1/rReg2 (266R/268R). Thus, during the initial state machine cycle, the lReg1 and rReg1 registers 266L and 266R are loaded with respective portions of the masked round state. During the next state machine cycle, these values are moved down the data path to the lReg2 and rReg2 registers 268L and 268R, while the lReg1 and rReg1 registers 266L and 266R are overwritten with random values stored in the register 230. During the third state machine cycle, the Feistel function of the right portion of the masked round state stored in rReg1 register 266R is calculated using the masked round key ($K \oplus M_K$) stored in the register 254, the input mask ($M_{IN}$) stored in the register 264, and the output mask ($M_{OUT}$) stored in the register 235.

As explained in more detail herein above, the Feistel function may be implemented by a non-linear transformation circuit which applies the expansion function to the portion of the masked round state, utilizes one or more parallel masked S-boxes to perform a non-linear transformation of the combination of the masked key with the output of the expansion function, and applies the permutation function to the S-box output. The S-boxes may be pre-computed using the input mask value stored in the fourth register and the output mask value stored in the second register.

During the fourth state machine cycle, multiplexers 260A and 260B, which are controlled by the round number parity signal, cause the lReg1 and rReg1 registers 266L and 266R to be updated with the new round state produced by the non-linear transformation circuit 250, which is masked using the values of α (register 256) and β (register 257). After the completion of the final DEA round, the resulting round state is stored in the TDEA operation result (desOut) register 262. As noted herein above, the TDEA operation result stored in the register 262 is combined with the third pre-computed mask value φ stored in the register 258 and is fed back, via the multiplexer 224 controlled by the TDEA operation number signal, to the DEA input register 222. After the completion of the final TDEA operation, the resulting state is stored in the TDEA output register 270, unmasked by the concatenation of MaskL and MaskR values, which are stored in the respective registers 225L and 225R, and finally subjected to the permutation 275.

In various implementations, the example circuit 900 of FIG. 9 may be further optimized. In the example implementation of FIG. 10, the example circuit 900 of FIG. 9 may be modified by embedding the value of β into the Feistel output mask $M_{OUT}$ (register 235), thus eliminating the dedicated register 257 of FIG. 9. In certain implementations, instead of using a register 258 to store a mask correction value (α, α), the 32-bit value α stored in register 256 may be re-used, by duplicating this value and thus obtaining a 64-bit mask correction value used at the end of the DES operation, thus eliminating the register 258 altogether. Further optimizations are possible, e.g., by using the same mask value for masks $M_{IN}$ and $M_{OUT}$, thus further reducing the number of registers.

Figure 10:
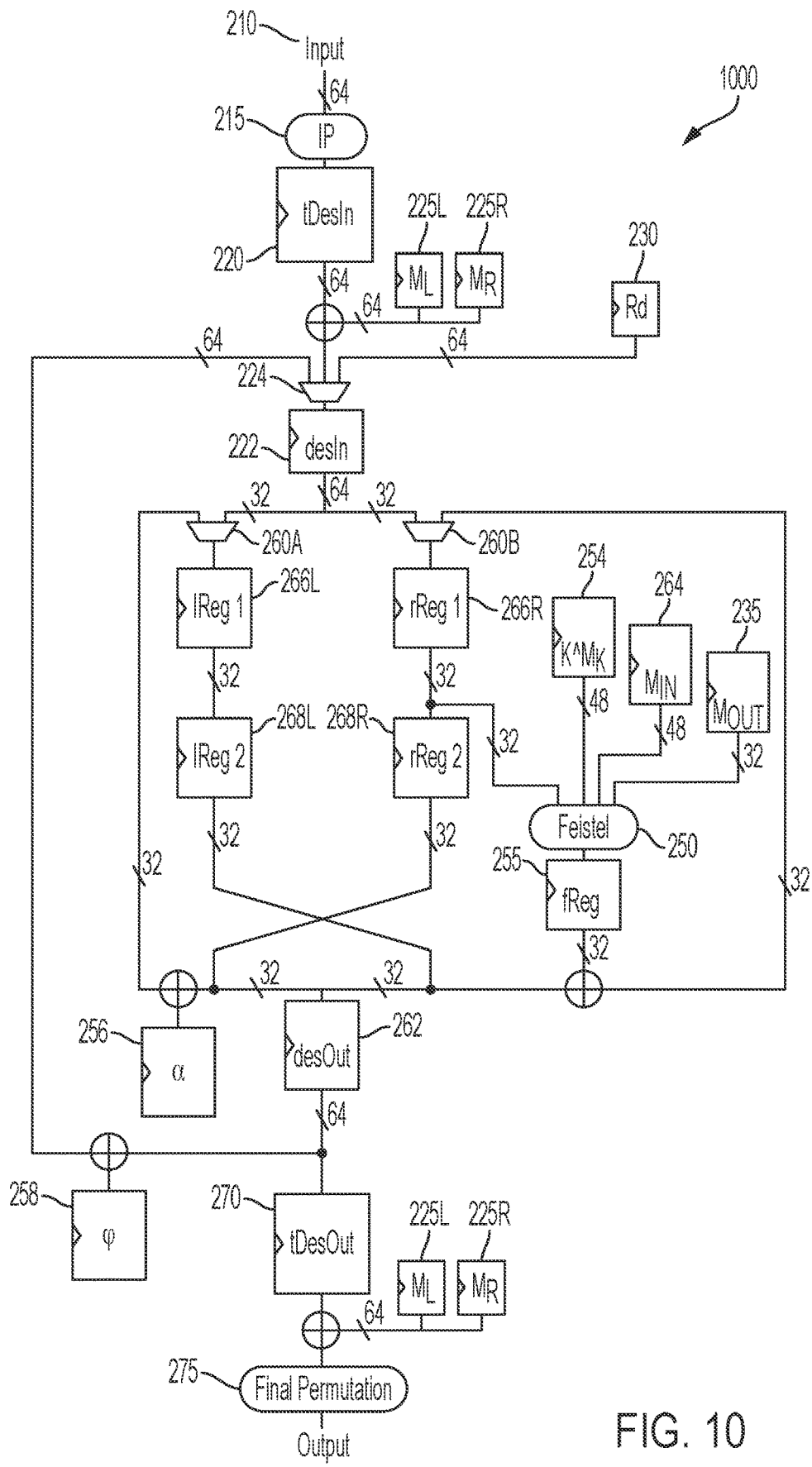

The example circuit 1000 of FIG. 10 exhibits the degree of external monitoring attack protection that is similar to the degree of protection of the example circuit 900 of FIG. 9.

Figure 11:
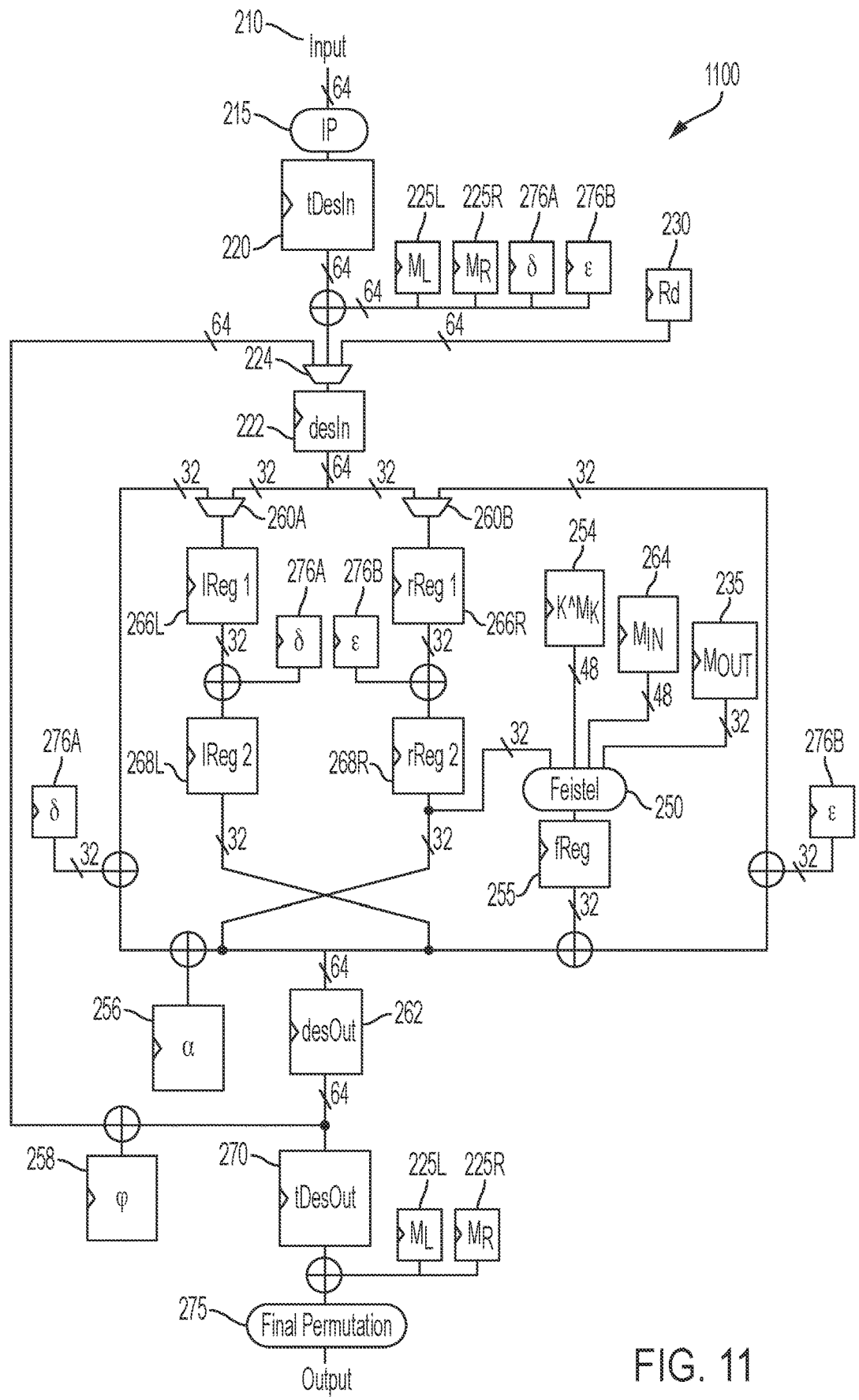

In the example implementation of FIG. 11, the example circuit 1000 of FIG. 10 may be further modified by adding the mask registers 276A-276B to store random values of δ and ε, which may be updated at every round in order to reduce the correlation between the output and other values when looping back after completion of each DES operation. As schematically illustrated by FIG. 11, at every DEA round, the Feistel function value stored in the register 255 may be combined with the values of α and δ, which are stored in the respective registers 256 and 276A, before being fed to the round state registers lReg1 (266L). Furthermore, at every DEA round, the Feistel function value stored in the register 255 may be combined with the value of ε, which is stored in the register 276B, before being fed to the round state register rReg1 (266R).

The mask correction values and other dependent masks may be pre-computed and stored in the respective registers. As schematically illustrated by FIG. 11, a first register (256) may be employed to store a first pre-computed mask value α represented by the combination of two random values representing the left and right portions of the mask:

$$\alpha = M_L \oplus M_R,$$

where $M_L$ and $M_R$ respectively represent the left and right portions of the mask, which are stored in registers 225L and 225R, respectively.

A second register (235) may be employed to store the output mask value $M_{OUT}$ represented by the inverse Feistel permutation function of the right portion of the mask:

$$M_{OUT} = \text{InvP}(M_R).$$

A third register (264) may be employed to store the input mask value $M_{IN}$ represented by the combination of the expansion function of the right portion of the mask and the key mask value $M_K$:

$$M_{IN} = E(M_R) \oplus M_K.$$

A fourth register (258) may be employed to store a third pre-computed mask value:

$$\varphi = \text{cat}(\alpha \oplus \delta, \alpha \oplus \varepsilon),$$

where cat represents the concatenation operation.

The input data block 210 is processed by the initial permutation 215 and stored in the TDEA input register (tDesIn) 220. The permuted input value tDesIn is then masked with masks stored in maskL/maskR registers 225L-225R and stored in the DEA input register (desIn) 222. The multiplexer 224, controlled by the TDEA operation number signal, feeds the register 222 with either the random value stored in the register 230 or the feedback from the previous TDEA operation combined with the third pre-computed mask value φ stored in the register 258. In certain implementations, instead of using a register 258 to store a mask correction value (α, α), the 32-bit α value stored in register 256 may be re-used, by duplicating this value and thus obtaining a 64-bit mask correction value used at the end of the DES operation, thus eliminating the register 258 altogether.

Figure 12:
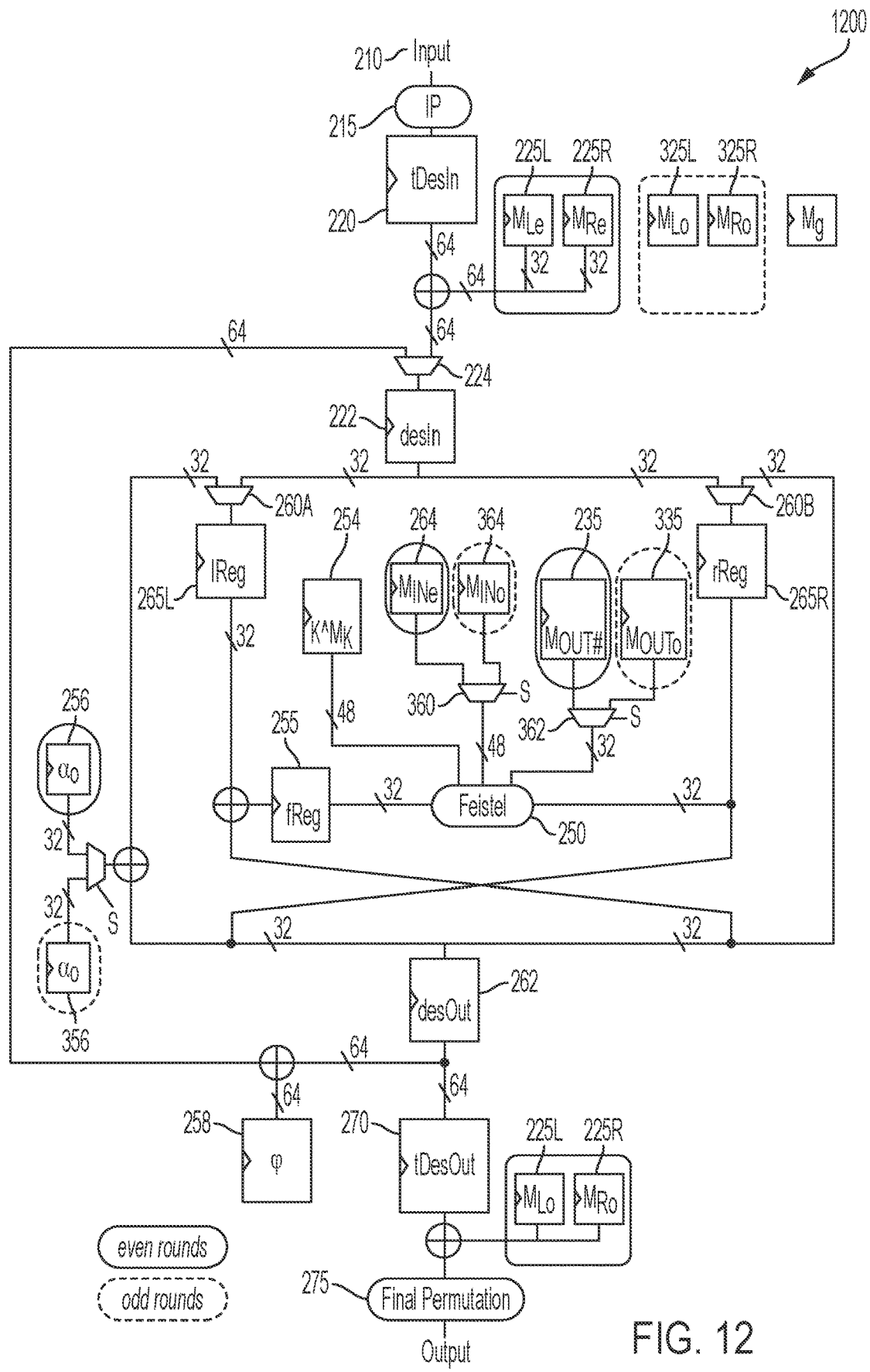

FIG. 12 schematically illustrates another example circuit 1200 for performing TDEA computations in a manner resistant to external monitoring attacks, in accordance with one or more aspects of the present disclosure. In the example implementation of FIG. 12, instead of register pre-charging, the round leakage and other correlations in the linear path of the block cipher data path may be reduced by utilizing different sets of fixed masks for odd and even rounds. As schematically illustrated by FIG. 12, the multiplexers 360 and 362, which are controlled by the round number parity signal, select the even round masks $M_{INe}$ and $M_{OUTe}$ or odd round masks $M_{INo}$ and $M_{OUTo}$ for feeding the Feistel function 250. As the data path is fully masked, no round leak is observable. Furthermore, since different masks are employed for masking the round state at the odd and even rounds, there is no hamming distance register-to-register leakage, and thus register pre-charging becomes redundant.

The mask correction values and other dependent masks may be pre-computed and stored in the respective registers ("e" indices indicate masks utilized by even rounds and "o" indices indicate masks utilized by odd rounds). As schematically illustrated by FIG. 12, a first register (256) may be employed to store a first pre-computed mask value $\alpha_e$ utilized for even computation rounds. The value $\alpha_e$ may be represented by the combination of two random values representing the left and right portions of the mask:

$$\alpha_e = M_{Lo} \oplus M_{Re},$$

where $M_{Lo}$ and $M_{Re}$ respectively represent the left and right portions of the mask utilized for even computation rounds, which are stored in registers 325L and 225R, respectively.

A second register (356) may be employed to store a second pre-computed mask value $\alpha_e$ utilized for odd computation rounds. The value $\alpha_e$ may be represented by the combination of two random values representing the left and right portions of the mask:

$$\alpha_o = M_{Le} \oplus M_{Ro},$$

where $M_{Le}$ and $M_{Ro}$ respectively represent the left and right portions of the mask utilized for even computation rounds, which are stored in registers 225L and 325R, respectively.

A third register (235) may be employed to store the output mask value $M_{OUT_e}$ utilized for even computation rounds. The output mask value $M_{OUT_e}$ may be represented by the inverse Feistel permutation function of the of the second pre-computed mask value $\alpha_o$:

$M_{OUT_e}=\text{InvP}(\alpha_o)$, where InvP represents the inverse Feistel permutation function.

A fourth register (335) may be employed to store the output mask value $M_{OUT_o}$ utilized for odd computation rounds. The output mask value $M_{OUT_o}$ may be represented by the inverse Feistel permutation function of first pre-computed mask value $\alpha_e$:

$M_{OUT_o}=\text{InvP}(\alpha_e)$, where InvP represents the inverse Feistel permutation function.

A fourth register (264) may be employed to store the input mask value Muse utilized for even computation rounds. The input mask value $M_{IN_e}$ may be represented by the combination of the expansion function of the right portion of the mask and the key mask value $M_K$:

$M_{IN_e}=E(M_{Re})\oplus M_K$, where E represents the expansion function, and $M_K$ represents the mask value for masking the round key K.

A fifth register (364) may be employed to store the input mask value $M_{IN_e}$ utilized for odd computation rounds. The input mask value $M_{IN_o}$ may be represented by the combination of the expansion function of the right portion of the mask and the key mask value $M_K$:

$M_{IN_o}=E(M_{Ro})\oplus M_K$, where E represents the expansion function, and $M_K$ represents the mask value for masking the round key K.

A sixth register (258) may be employed to store a third pre-computed mask value:

$\varphi=\text{cat}(M_{Le}\oplus M_{Re}, M_{Le}\oplus M_{Re})$

Therefore, the Feistel function 250 may be implemented by a non-linear transformation circuit which applies the expansion function to the portion of the masked round state, utilizes one or more parallel masked S-boxes to perform a non-linear transformation of the combination of the masked key with the output of the expansion function, and applies the permutation function to the S-box output. The S-boxes for even rounds may be pre-computed using the input mask value $M_{IN_e}$ stored in the fourth register (264) and the output mask value $M_{OUT_e}$ stored in the third register (235). The S-boxes for even rounds may be pre-computed using the input mask value $M_{IN_o}$ (364) stored in the fourth register and the output mask value $M_{OUT_o}$ (335) stored in the third register.

Figure 13:
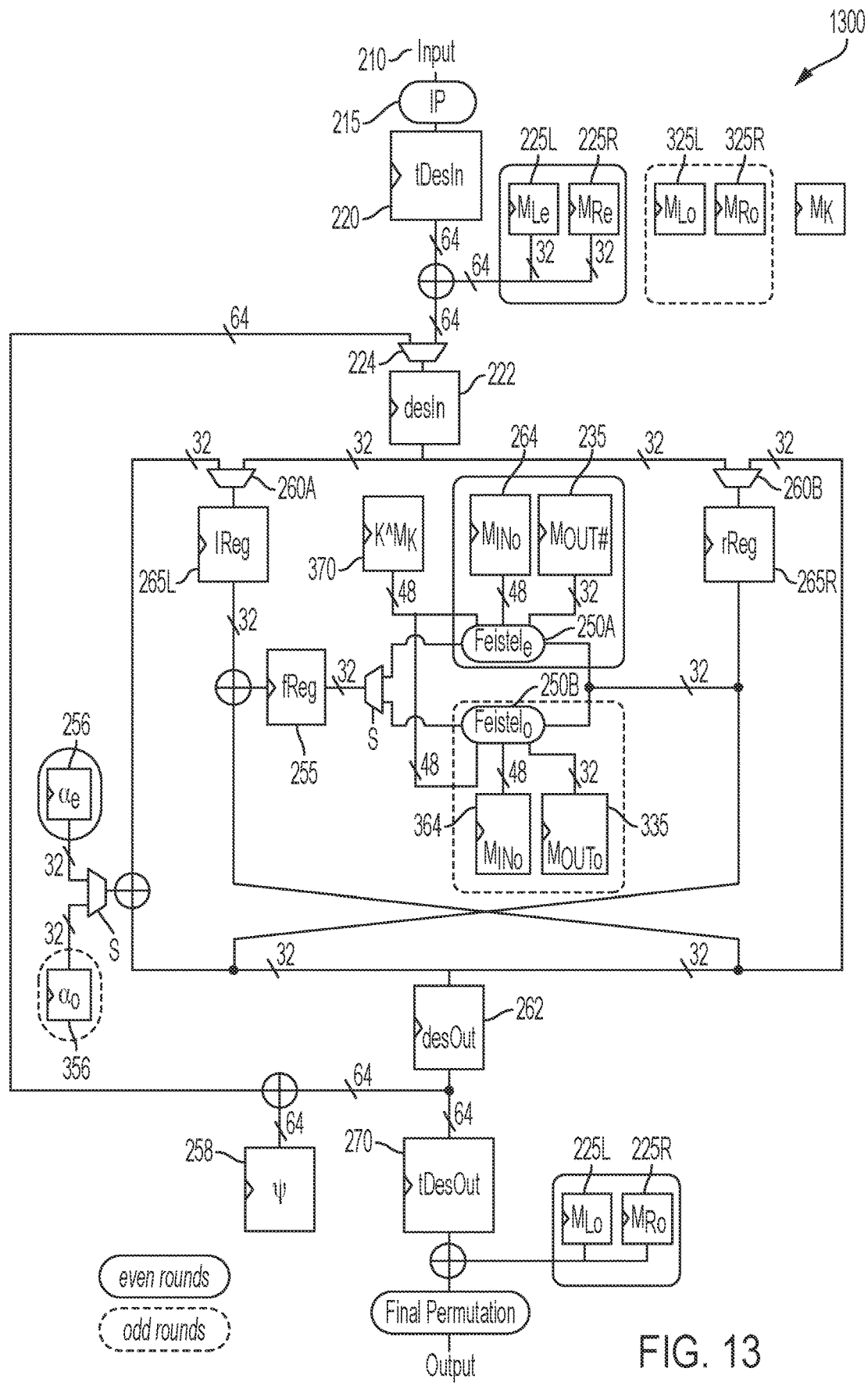

FIG. 13 schematically illustrates another example circuit 1300 for performing TDEA computations in a manner resistant to external monitoring attacks, in accordance with one or more aspects of the present disclosure. In the example implementation of FIG. 13, instead of register pre-charging, the round leakage and other correlations in the linear path of the block cipher data path may be reduced by utilizing two sets of masked S-boxes for odd and even rounds. As schematically illustrated by FIG. 13, the multiplexer 370, which is controlled by the round number parity signal, selects the even Feistel function 250A and even round masks Muse and $M_{OUT_e}$ or odd Feistel function 250B and odd round masks $M_{IN_o}$ and $M_{OUT_o}$ for feeding the Feistel function result register 255.

The mask correction values and other dependent masks may be pre-computed as follows ("e" indices indicate masks utilized by even rounds and "o" indices indicate masks utilized by odd rounds):

$\alpha_e=M_{Lo}\oplus M_{Re}$, where;

$\alpha_o=M_{Le}\oplus M_{Ro}$;

$M_{IN_e}=E(M_{Re})\oplus M_K$, $M_{IN_o}=E(M_{Ro})\oplus M_K$, $M_{OUT_e}=\text{InvP}(\alpha_o)$;

$M_{OUT_o}=\text{InvP}(\alpha_e)$; and $\varphi=\text{cat}(M_{Le}\oplus M_{Re}, M_{Le}\oplus M_{Re})$.

Figure 14:
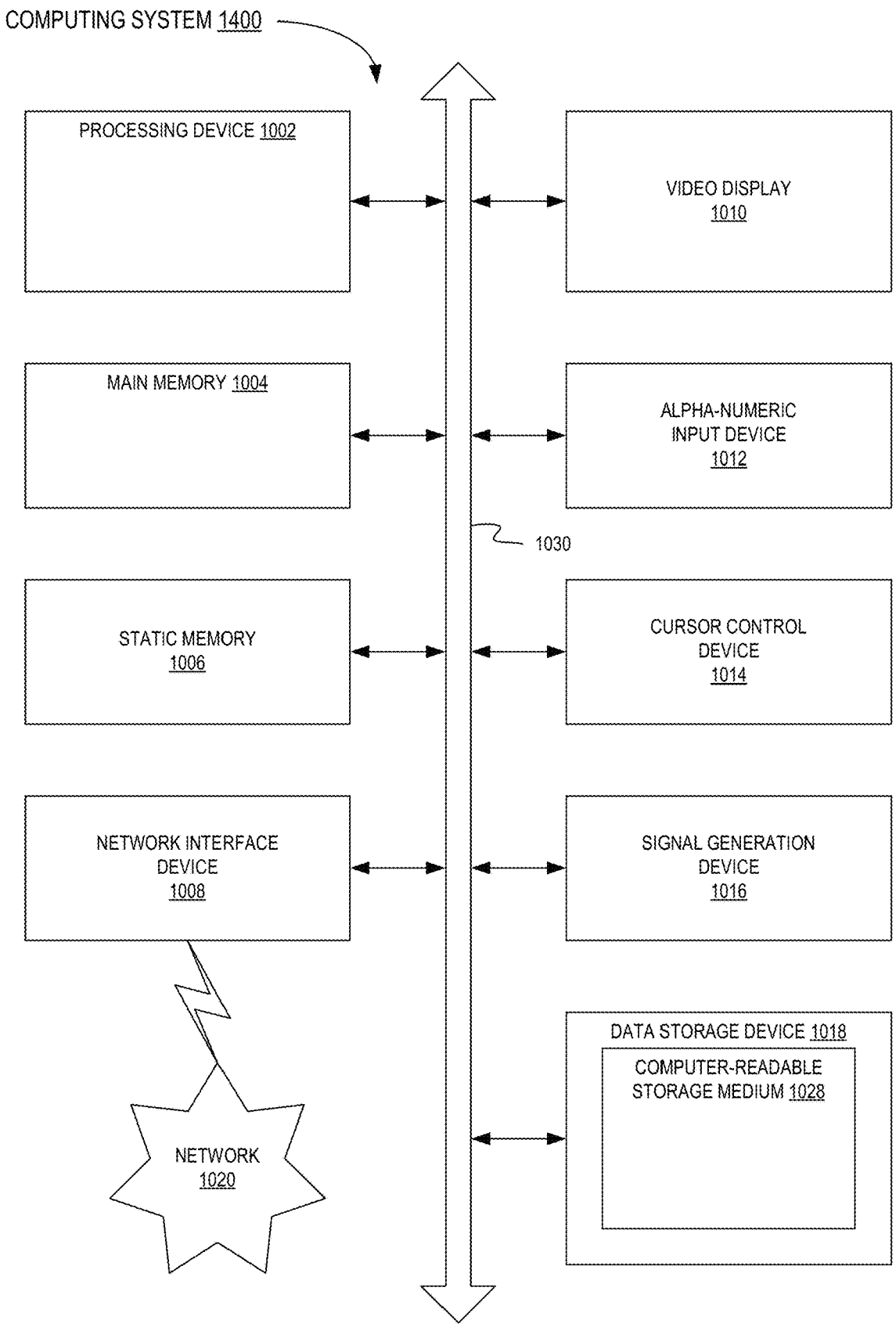
FIG. 14 illustrates a diagrammatic representation of a computing system 1400 which may incorporate the example circuits and cryptographic data processing devices described herein.

FIG. 14 illustrates a diagrammatic representation of a computing system 1400 which may incorporate the example circuits and cryptographic data processing devices described herein. Computing system 1400 may be connected to other computing devices in a LAN, an intranet, an extranet, and/or the Internet. The computing device may operate in the capacity of a server machine in client-server network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods described herein.

The example computing system 1400 may include a processing device 1002, which in various illustrative examples may be a general purpose or specialized processor comprising one or more processing cores. The example computing system 1400 may further comprise a main memory 1004 (e.g., synchronous dynamic random access memory (DRAM), read-only memory (ROM)), a static memory 1006 (e.g., flash memory and a data storage device 1018), which may communicate with each other via a bus 1030.

The example computing system 1400 may further include a network interface device 1008 which may communicate with a network 1020. The example computing system 1400 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1016 (e.g., a speaker). In one embodiment, the video display unit 1010, the alphanumeric input device 1012, and the cursor control device 1014 may be combined into a single component or device (e.g., an LCD touch screen).

The data storage device 1018 may include a computer-readable storage medium 1028 on which may be stored one or more sets of instructions implementing any one or more of the methods or functions described herein. The instructions may also reside, completely or at least partially, within the main memory 1004 and/or within the processing device 1002 during execution thereof by the example computing system 1400, hence the main memory 1004 and the processing device 1002 may also constitute or comprise computer-readable media. The instructions may further be transmitted or received over the network 1020 via the network interface device 1008.

While the computer-readable storage medium 1028 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "updating", "identifying", "determining", "sending", "assigning", or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. An apparatus for implementing a block cipher in a manner resistant to external monitoring attacks, the apparatus comprising:
   a permutation circuit configured to produce a round state of a cryptographic operation of the block cipher by permuting an input data block;
   a masking circuit configured to produce a masked round state by masking the round state using a mask value;
   a non-linear transformation circuit configured to apply an expansion function to a masked round state of a round of the cryptographic operation thus producing an output of the expansion function, perform a non-linear transformation of a combination of a masked key with the output of the expansion function thus producing an output of the non-linear transformation, and apply the permutation function to the output of the non-linear transformation thus producing a modified first portion of the masked round state;
   two round feedback circuits coupled to the non-linear transformation circuit, wherein the two round feedback circuits are configured to swap the modified first portion of the masked round state with a second portion of the masked round state and produce a new masked round state by combining the swapped masked round state with the mask value;
   wherein the apparatus is configured to re-compute the mask value by swapping a first partial mask value of the round state stored in a first mask register and a second partial mask value of the round state stored in a second mask register at every round of the cryptographic operation.

2. The apparatus of claim 1, further comprising:
   an operation feedback circuit configured to combine a result of the cryptographic operation with a second mask value and store the result in an input register.

3. The apparatus of claim 1, further comprising:
   an output register configured to store a result of the cryptographic operation, wherein the result of the cryptographic operation comprises the masked round state.

4. The apparatus of claim 1, wherein the non-linear transformation circuit utilizes one or more masked substitution tables.

5. An apparatus for implementing a block cipher in a manner resistant to external monitoring attacks, the apparatus comprising:
   a permutation circuit configured to produce a round state of a cryptographic operation of the block cipher by permuting an input data block;
   a masking circuit configured to produce a masked round state by masking the round state using one of:
   a first input mask value or a second input mask value; a non-linear transformation circuit configured to apply an expansion function to a masked round state of a cryptographic operation of the block cipher thus producing an output of the expansion function, perform a non-linear transformation of a combination of a masked key with the output of the expansion function thus producing an output of the non-linear transformation, and apply the permutation function to the output of the non-linear transformation thus producing a modified first portion of the masked round state, wherein the non-linear transformation for even computation rounds is performed using the first input mask value and a first output mask value that are selected by a first mask selector, and wherein the non-linear transformation for odd computation rounds is performed using the second input mask value and a second output mask value that are selected by a second mask selector; and
   two round feedback circuits coupled to the non-linear transformation circuit, wherein the two round feedback circuits are configured to swap the modified first portion of the masked round state with a second portion of the masked round state and produce a new masked round state by combining the swapped masked round state with one of:
   the first input mask value for even computation rounds or the second input mask value for odd computation rounds.

6. The apparatus of claim 5, further comprising: an operation feedback circuit to combine a result of the cryptographic operation with a third input mask value and store the result of the cryptographic operation result in an input register.

7. The apparatus of claim 5, wherein the apparatus is configured to re-compute the first input mask value and the second input mask value at every iteration of the Triple Data Encryption Algorithm (TDEA) operations performed in the apparatus.

8. The apparatus of claim 5, further comprising:
an output register configured to store a result of the cryptographic operation, wherein the result of the cryptographic operation comprises the masked round state.

9. The apparatus of claim 5, wherein the non-linear transformation circuit utilizes one or more masked substitution tables.

10. An apparatus for implementing a block cipher in a manner resistant to external monitoring attacks, the apparatus comprising:
a permutation circuit configured to produce a round state of a cryptographic operation of the block cipher by permuting an input data block;
a masking circuit configured to produce a masked round state by masking the round state using one of: a first input mask value or a second input mask value;
a first non-linear transformation circuit configured to operate at even computation rounds to apply an expansion function to a masked round state of a cryptographic operation of the block cipher thus producing an output of the expansion function, perform a first non-linear transformation of a combination of a masked key with the output of the expansion function thus producing an output of the first non-linear transformation, and apply the permutation function to the output of the first non-linear transformation thus producing a modified first portion of the masked round state, wherein the first non-linear transformation is performed using the first input mask value and a first output mask value that are selected by a mask selector from a first register storing a first partial mask value and a second register storing a second partial mask value;
a second non-linear transformation circuit configured to operate at odd computation rounds to apply the expansion function to a masked round state, perform a second non-linear transformation of a combination of a masked key with an output of the expansion function, and apply the permutation function to the output of the second non-linear transformation, wherein the second non-linear transformation is performed using the second input mask value and a second output mask value; and
two round feedback circuits coupled to the first non-linear transformation circuit and to the second non-linear transformation circuit, wherein the two round feedback circuits are configured to swap the modified first portion of the masked round state with a second portion of the masked round state and produce a new masked round state by combining the swapped masked round state with one of: the first input mask value for even rounds or the second input mask value for odd rounds.

11. The apparatus of claim 10, further comprising: an operation feedback circuit to combine a cryptographic operation result with a third input mask value and store the result of the cryptographic operation in a cryptographic operation input register.

12. The apparatus of claim 10, wherein the apparatus is configured to re-compute the first input mask value and the second input mask value at every iteration of the Triple Data Encryption Algorithm (TDEA) operations performed in the apparatus.

13. The apparatus of claim 10, further comprising:
an output register configured to store a result of the cryptographic operation, wherein the result of the cryptographic operation comprises the masked round state.

* * * * *